Nov. 20, 1934.                H. G. DORSEY                1,981,587
                 METHOD OF AND APPARATUS FOR VISION TESTING
                     Filed Aug. 13, 1929        2 Sheets-Sheet 1
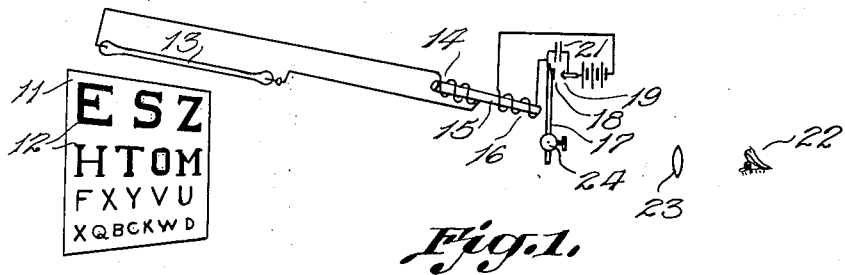
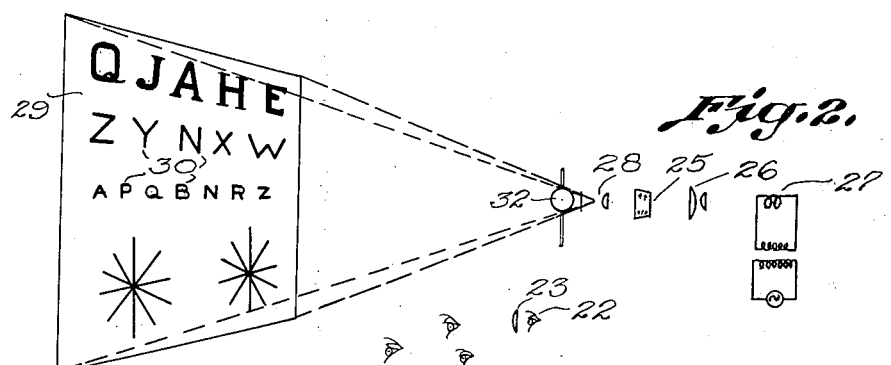
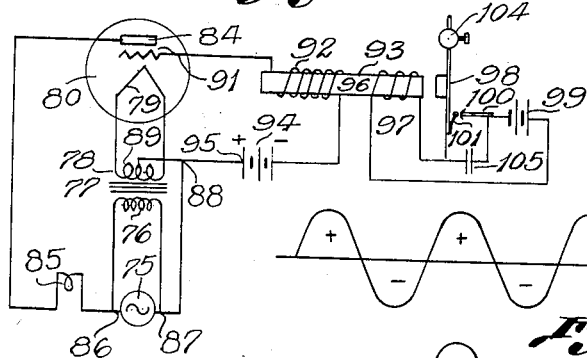
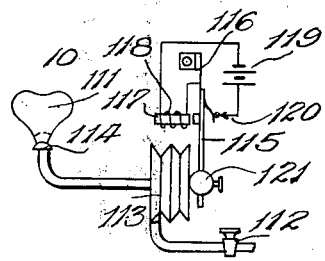
Inventor
Herbert Grove Dorsey Nov. 20, 1934.                H. G. DORSEY                 1,981,587
                METHOD OF AND APPARATUS FOR VISION TESTING
                      Filed Aug. 13, 1929        2 Sheets-Sheet 2

INVENTOR
Herbert Grove Dorsey

Patented Nov. 20, 1934

1,981,587

UNITED STATES PATENT OFFICE 1,981,587

METHOD OF AND APPARATUS FOR VISION TESTING

Herbert Grove Dorsey, Washington, D. C.

Application August 13, 1929, Serial No. 385,671

11 Claims. (Cl. 88—20)

One of the objects of this invention is to provide a novel method of testing eyesight during relaxed accommodation and suspended or relaxed convergence.

Another object is to provide a new condition favorable to a relaxed accommodation of eyes during test without the aid of mydriatic drugs.

Further objects are to provide apparatus whereby the novel idea may be carried out, and to produce illumination for brief intervals by different forms of energy.

It is a well known physiological fact that when asleep the eyes are in a condition of repose; accommodation and convergence are relaxed and there is absence of clonic spasm. It is further known that when awake there is constant effort of the eye muscles for accommodation and convergence in order that one may see as distinctly as possible whatever objects are looked at; sometimes clonic spasm causes apparent myopia when the defect is actually one of hypermetropia. It is still further known that accommodation and clonic spasm may be suspended by mydriatic drugs.

In the process of testing eyesight one of the practices is to have the patient look at a test chart consisting of characters of different sizes, and from the smallest character easily discerned and its distance estimate the strength of lens necessary to correct the defective refraction. This is then checked by using the indicated lenses from a test case in front of the eyes before the spectacles are actually made up for the patient. It is well known among eye examiners that as previously mentioned the eye tries to focus on the test object and that this makes it more difficult to easily find the proper lenses consequently the best practitioners use mydriatic drugs with beneficial results.

While this method is serviceable it has certain disadvantages and many inventions have been made to try to get as good results without the aid of mydriatics, but so far as I am aware no one has made use of the method I discovered during my researches in measuring ocean depths by sound waves with the fathometer. In that invention, as shown by Patent No. 1,667,540 issued April 24, 1928, I use the flash of a rotating neon tube back of a translucent scale to indicate the depth. I found that while I could easily read the figures on the scale in daylight or with any steady external illumination without wearing lenses to correct the astigmatism and hypermetropia of my eyes, I could not do so in a darkened room. However, with my spectacles on I could read the figures easily by the light of the neon tube flash shining through the translucent scale, even with no other illumination.

An analysis of this phenomenon shows that with continuous illumination the muscles of the eye have time to make continued effort towards accommodation and by this prolonged effort actually do focus on the object, provided, of course, that accommodation is not too much diminished. But if the illumination is of short duration, short as compared to the time required for accommodation, the muscles can not focus and the pupil is dilated and if there is any defect the image will be blurred. It is somewhat analogous to one trying to catch a person's finger if placed in one's hand. If the motion is slow it is easily caught, but when rapid it is nearly impossible except by anticipating the contact.

The conditions then are first, the eyes are in a darkened room, or one in which the illumination is so low that distinct images can not be formed and the eye muscles are at rest; second, the image is formed on the retina of the eye for a time interval so short that the eye muscles can not make appreciable accommodation; third, this process is repeated sufficiently often so that the eyes do not wander from the object observed.

I have since tested my own and others' eyes by this method and find it very successful. The illumination on the chart may be made to change from a very low to a very high value, or an image of a chart may be thrown on a screen for a brief interval, or the light from the chart may be permitted to reach the eye for only short intervals. The results are the same in any case.

While others have disclosed methods of varying the intensity of illumination in a gradual manner in order to test the acuity of vision as a function of the intensity, I have found no indication that anyone has used my method of sudden change in illumination. And it should be emphasized that by sudden change I mean that the light has been brought to its full intensity and subdued again so quickly that the eye muscles have not had time to act to any appreciable extent. For this reason it is evident that an incandescent lamp having a large filament could not be used as it would not cool quickly enough. Small filament lamps, rapidly acting shutters, discharges through gaseous lamps and sudden flashes of bare gas flames are the best adjuncts to the method.

This method is entirely different from moving picture processes which are possible because of the rapid succession of following images, whereas I provide a comparatively long time interval between images.

In the accompanying drawings Fig. 1 shows a method of illuminating a test chart by an instantaneous flash from a gaseous tube;

Fig. 2 shows a method of projecting an image on a screen for periodic brief intervals;

Fig. 3 shows circuit connections for producing current flow during single half cycles of alternating current;

Figs. 4 and 5 illustrate alternating current wave form and a single half wave as used in the circuit of Fig. 3;

Fig. 6 shows a method of producing flashes by a gas flame;

Figure 7:
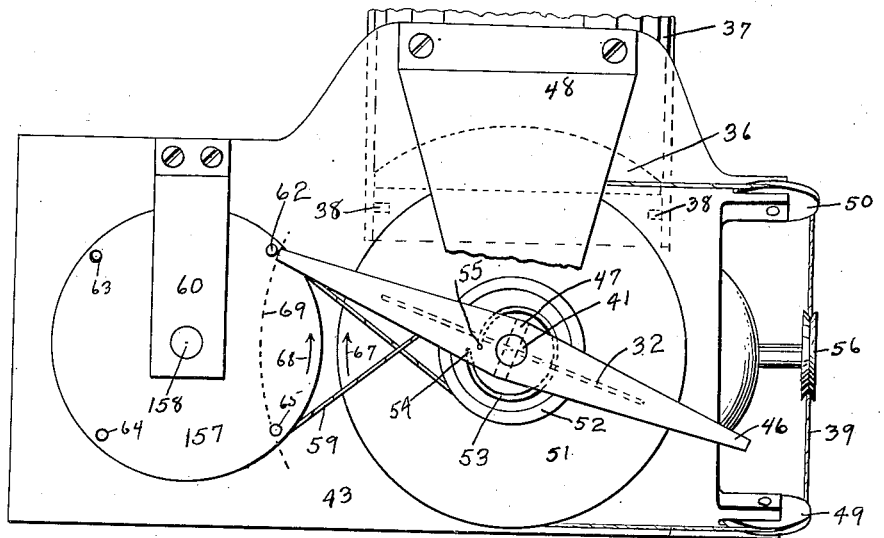
Figs. 7 and 8 show top and front views of a shutter operating for periodic brief intervals to use with Fig. 2.

Referring to the accompanying drawings and particularly to Fig. 1, one embodiment of this invention comprises a test chart 11 and letters thereon, 12. Illumination is furnished periodically by a tube 13 which is filled at low pressure with some gas such as neon or mercury vapor or a combination of gases so that it becomes a source of illumination when a discharge of electricity passes through it, as is well understood by those versed in the arts. The electric discharge is supplied from a secondary winding 14 of an induction coil having a core, 15 of soft iron wires and a primary coil, 16 connected in series with a vibrator 17, contacts 18 and 19 and a battery or other source of E. M. F. 20. The vibrator 17 has an adjustable weight 24 whereby the period of vibration may be adjusted to some suitable value. The contacts 18 and 19 may be shunted by a condenser 21 as is usual in spark coil operation so that the voltage induced in the secondary is trivial when the circuit is closed, but very high when the circuit is opened at the contacts. At each break of the circuit by the contacts there is a momentary rush of electrons into the gaseous tube ionizing the gas or vapor therein so as to make it luminous. This luminosity disappears almost immediately. A single flash of illumination lasting only a few thousandths of a second is followed by a comparatively long period of darkness until the next interruption of the primary circuit is made. The test chart may be distant from or near to the patient's eye, 22 and a test lens 23 may be one of a series used in determining the necessary combination.

In Fig. 2 a lantern slide, 25 of a test chart is shown in front of a condensing lens system, 26 and illuminated by a lamp 27 which may be a concentrated filament incandescent lamp operated from a transformer as shown, or it may be any of the regular projection lamps. The objective lens system, 28 produces an enlarged inverted image on the screen 29 in the regular well known manner. Letters and characters 30 and 31 are enlarged images of the smaller characters on the slide 25.

Figure 8:
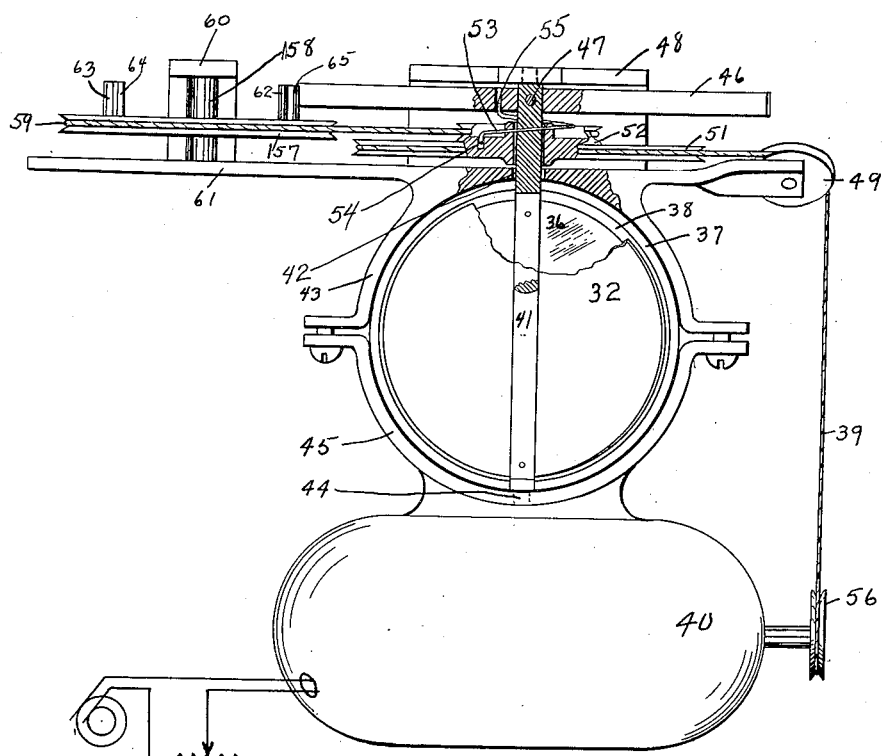

In the operation of this form of the invention the illuminant shines in a steady manner but the illumination producing the image is allowed to pass only at periodic brief intervals by the shutter 32 by mechanism which is clearly shown in detail in Figs. 7 and 8, where Fig. 7 shows a top view and Fig. 8 a front view with portions broken away to show detail.

This is a motor driven shutter arranged to be clamped to the objective lens mounting of a projection lantern or it may be used in front of an illuminant. The shutter, 32 is a thin light member held rigidly by a shaft 41 having one bearing 42 in the upper half 43 of the shutter housing and another bearing 44 in the lower half 45 of the housing. One of the objective lenses 36 is shown in its lens tube 37 and diaphragm 38 is used to prevent light from shining around the edges of the shutter 32. Near the upper end of the shaft an arm 46 is rigidly pinned to the shaft 41 by a pin 47 passing through both. A third bearing at the top end of the shaft 41 is furnished by the angle bracket piece 48, partly broken away in Fig. 7.

The three bearings support the shaft 41 carrying the shutter 32 and arm 46 in a substantial manner so that the combination will withstand the shocks of sudden stopping from its high speed of rotation as will be described later.

Between the middle bearing 42 and the arm 46 is a two step cone pulley 51 and 52 running loosely on the shaft and using the shaft as a bearing. The smaller pulley, 52 of this cone is hollowed out as shown to provide space for a spiral spring 53 which is attached at one end in the hole 54 of the pulley 52 and at the other end in a hole 55 in the arm 46. This spring is a resilient driving means between the pulleys 51 and 52 and the arm 46, shaft 41 to shutter 32. The larger cone pulley 51 derives power from a motor 40 by a belt 39 passing over the motor pulley 56 and two idlers 49 and 50. The motor runs at a uniform speed which may be varied by means of a rheostat 57 in series with a power supply 58.

The pulley 52 drives another pulley 157 on its shaft 58 by means of a belt 59, the shaft 158 having its upper bearing in a bracket 60 and lower bearing in the housing plate 61. The pulley 157 carries a number of pins 62, 63, 64, and 65 rigidly secured in a circle on the side of the pulley. The number of pins should be an even number of times the ratio of the diameters of the wheels 157 and 52, or this ratio may be slightly more to provide for slippage when the belt is driven as shown. In the drawings the diameter of 157 is approximately twice that of 52 and four pins are shown. Consequently wheel 52 will rotate at a constant speed twice that of 157 and the spring 53 will be storing energy until one of the pins releases the arm 46. In the drawings the pin 62 has just reached such a position and the arm 46 will now be rotated rapidly by energy stored in spring 53 until it has made nearly a half revolution in a clockwise direction so that the other end will strike against pin 65, which meanwhile has moved a slight distance in a counterclockwise direction. These directions are indicated by the arrows 67 and 68 and a small dotted arc 69 shows the path of the arm 46 over the wheel 157.

During this half revolution, which lasts only a few thousandths of a second the shutter will have opened and closed permitting illumination for a brief period to pass to the screen 29 during which time an image of the lantern slide 25 is produced thereon.

In Fig. 3 a circuit is shown for producing momentary illumination in another way. A source of alternating E. M. F. 75 supplies current to the primary 76 of a transformer 77, the secondary 78 of which furnishes heating current to the filament 79 of a thyratron tube 80. This is a hot cathode tube containing mercury vapor and is well known for its property of the grid having no influence on the plate, once the plate current starts to flow, until the plate current itself is reduced to zero, as happens once each cycle in alternating current flowing in a thermionic tube.

In the present case the plate, 84 is connected to one terminal of 85 which may be an incandescent lamp with an attenuated filament or it may be the primary of a transformer, the secondary of which may be connected to a glow discharge tube. The other terminal of 85 is connected to one polarity, 86 of a source of alternating electromotive force, which in this case is 75, the one already shown or it may be a separate source having different voltage and frequency, provided the other polarity, 87 of the said source is connected to the filament 79 or the midtap thereto as shown by the circuit 87, 88, 89. The grid, 91 is connected to one side of the secondary, 92 of an induction coil, 93 and the other side of 92 is connected to the negative side of a grid biasing battery 94, the positive terminal, 95 of which goes to the center tap 89. The grid bias is sufficiently negative to ordinarily prevent any flow of plate current.

The induction coil, 93 has a core 96, on which is wound a primary 97, one terminal of which goes to a vibrator or armature 98 and the other terminal goes to one polarity of a battery 99 which has its other polarity connected to a stationary contact 100. In juxtaposition to this is a movable contact, 101 carried by the vibrator 98. An adjustable weight 104 makes the frequency of vibration of the armature variable within limits. The action of the induction coil is the usual one, the armature being attracted, the circuit broken, etc., and a condenser 105 is shunted around the contacts 100 and 101 with the proper poling of the battery 99 so that there is produced a high positive potential on the grid 91 of the thyratron 80 whenever the circuit is broken.

Now the action in the circuit of the thyratron, as will be readily understood by those familiar with this form of thermionic tube is as follows: Normally there will be no plate current since the grid is negative; and when the grid is positive there can be plate current only during the positive halves of the alternating current wave shown by Fig. 4, since during the negative half there is no positive charge on the plate to attract electrons from the filament. When the armature, 98 operates to open the circuit through the primary 97, the grid, 91 will be made positive for a time depending on the constants of the induction coil and its battery. These can be chosen so that the positive charge on the grid lasts about one cycle, so that for each interruption there will be a flow of one and only one positive half cycle through the plate-filament circuit of the thyratron, or specifically, electrons will flow from the filament 79 to the plate 84, thence through 85 to 86, through 75, to 87, to 88, to 89 and back to filament 79. Since mercury vapor permits considerable flow of plate current with but little loss in voltage, it is easy to bring to incandescence the filament of a lamp during this single half cycle of say a 60 cycle current. Or if 85 represents the primary of a transformer it is easily understood how there will be induced in its secondary a reversed electromotive force which may produce a signal or illuminate another tube.

This method of single signal production is different from that of myself and Fay in our application for Submarine signaling, Serial No. 31,873 filed May 21, 1925 where we used direct current in the plate circuit. My present method makes use of a different type of tube and is applicable only to alternating current.

The momentary glow in the thyratron itself may be used as the illuminant when considerable plate current is allowed to flow; or the thyratron may be replaced for such use by one of the recently developed hot cathode discharge tubes having only two electrodes.

Another form of my invention for producing instantaneous flashes of illumination at periodic intervals is shown in Fig. 6 and may be used in places where electric power sources are not easily available. A gas flame, 111 is shown burning at its maximum brilliancy by the full curve and in a greatly reduced condition by the dotted curve. Gas for the burner is furnished by a source not shown and passes through an adjustable stopcock 112 into a reservoir 113 and thence to the burner 114. A vibrator, 115 oscillates about its flexible support 116 actuated in a manner similar to electric bells, having a magnet, 117 with a winding 118, one end of which passes to the vibrator 115 and the other end through a battery 119 to a contact 120. At each stroke of the vibrator an adjustable hammer, 121 strikes the diaphragm of the reservoir 113 and produces a momentary increase in pressure on the gas in the reservoir. The stop-cock, 112 is adjusted so that normally a small flow of gas keeps the reservoir filled and maintains a small flame at the burner as shown by the dotted line. Whenever the hammer strikes the reservoir the sudden pulse of gas causes the flame to flash up to its full brilliancy. Since the flame is composed of heated molecules having little heat inertia the flame drops instantly to its normal non-luminous value as soon as the pulse of gas is consumed. Thus there will be produced instantaneous flashes of light at intervals dependent on the frequency at which the electric hammer is adjusted, and these recurring flashes may be used to illuminate a test chart for my method of testing vision.

Different forms of apparatus having been described with which may be produced brief illumination at periodic intervals, the operation of eye examination is as follows: The patient is placed in a room darkened, or nearly so and one of the hereintofore described methods of making a test chart visible is put into operation. Any of the regular methods of testing eyesight is then used such as the trial lens system in which different lenses are tried in a trial frame, preferably on one eye at a time, until the proper combination is found to entirely compensate for any refractive or strabismus trouble.

Having described my invention I claim:

1. The method of testing vision, comprising placing the subject in a room sufficiently dark to cause relaxation of eye muscles and measuring the refractive error while the subject views a test chart which is illuminated at intervals frequent enough to prevent wandering of the eyes, the duration of said illumination being less than necessary for optical accommodation.

2. An optic testing device including a test chart, test lenses and means for producing discontinuous illumination so that said chart is illuminated at regular recurring intervals, the duration of said illumination being less than that required for ocular accommodation and the rate of recurrence of said illumination being sufficient to prevent wandering of the eyes.

3. The method of testing ocular refraction which consists in first, placing the subject in a darkened room until his eye muscles are relaxed, second, producing near the retina of subject's eyes optic images of a test chart for such short periods that ocular accommodation does not occur, third, repeating this process at regular recurring intervals too often to allow ocular wandering; fourth, during this continuance trying different lens systems in front of subject's eyes until a sharp image is produced upon said retina.

4. The method of testing vision comprising placing the subject in a darkened room and trying various lens combinations in front of the subject's eyes during the production at regular predetermined intervals of optic stimuli the duration of which are too short to produce ocular accommodation, the stimuli occurring often enough to prevent ocular wandering.

5. The method of testing vision comprising placing the subject in a room sufficiently dark to prevent ocular accommodation and then testing the ocular refraction during regular optic stimuli of definite form, the duration of which are for definite predetermined periods less than those required for ocular accommodation and the recurrences of which are too often to cause optic wandering.

6. The method of testing vision while the subject is in a space sufficiently dark to prevent involuntary ocular accommodation by producing an image approximately on the subject's retina at regular predetermined intervals for definite predetermined flash periods less than the time necessary for involuntary accommodation and determining by trial a lens system which places said image on said retina.

7. An optical test device comprising a test chart adapted to refractive tests, refractive lenses and means for illuminating said chart by predetermined successive flashes of light at regular recurring intervals, said flashes being of such short duration that ocular accommodation is impossible and said intervals being sufficiently short to prevent ocular wandering.

8. The method of testing ocular refraction which consists in testing the subject's eyes in a darkened room while he watches a test chart receiving regular predetermined flashes of illumination, the duration of the flashes being less than that required for ocular accommodation and the frequency of flashes being too great to allow wandering of the subject's eyes.

9. An optical test device comprising a test chart adapted to refractive tests and means for illuminating said chart by predetermined successive flashes of light at regular recurring intervals, said flashes being of such short duration that ocular accommodation is impossible and said intervals being sufficiently short to prevent ocular wandering.

10. The method of testing vision, comprising placing the subject in a room sufficiently dark to cause relaxation of the eye muscles and measuring the refractive error while the subject views test images which are made at regular intervals frequent enough to prevent wandering of the eyes, the duration of said images being less than that necessary for optical accommodation.

11. An optic test device comprising a test chart, refractive lenses for testing vision and means for projecting images of said chart at predetermined regular recurrences, the duration of said images being too short for ocular accommodation and said recurrences being too often to permit ocular wandering.

HERBERT GROVE DORSEY.